US012270731B2

(12) United States Patent
Campos

(10) Patent No.: US 12,270,731 B2
(45) Date of Patent: Apr. 8, 2025

(54) AUTOMATED ANALYSIS AND SORTING OF MILLING DRUM TOOLS

(71) Applicant: Pavement Recycling Systems Inc., Jurupa Valley, CA (US)

(72) Inventor: Jorge Campos, Jurupa Valley, CA (US)

(*) Notice: Subject to any disclaimer, the term of this patent is extended or adjusted under 35 U.S.C. 154(b) by 0 days.

(21) Appl. No.: 17/715,936

(22) Filed: Apr. 7, 2022

(65) Prior Publication Data

US 2022/0326111 A1    Oct. 13, 2022

Related U.S. Application Data

(60) Provisional application No. 63/172,165, filed on Apr. 8, 2021.

(51) Int. Cl.
| | |
|---|---|
| *G01M 5/00* | (2006.01) |
| *B07C 5/10* | (2006.01) |
| *B07C 5/12* | (2006.01) |
| *G01N 21/88* | (2006.01) |
| *G06T 7/00* | (2017.01) |

(52) U.S. Cl.
CPC ............. *G01M 5/0033* (2013.01); *B07C 5/10* (2013.01); *B07C 5/12* (2013.01); *G01M 5/0091* (2013.01); *G01N 21/88* (2013.01); *G06T 7/0002* (2013.01)

(58) Field of Classification Search
None
See application file for complete search history.

(56) References Cited

U.S. PATENT DOCUMENTS

| | | |
|---|---|---|
| 10,105,808 B2 | 10/2018 | Nakayama |
| 10,416,056 B2 | 9/2019 | Paulsen et al. |
| 11,209,812 B2 | 12/2021 | Hirman et al. |

(Continued)

FOREIGN PATENT DOCUMENTS

| | | |
|---|---|---|
| CN | 202144032 U | 2/2012 |
| EP | 1472413 A1 | 11/2004 |

(Continued)

OTHER PUBLICATIONS

Espacenet machine translation, Ito Takayuki et al., "Tool Tip Defect Inspecting System," JPH1096616A, Apr. 14, 1998 (Year: 1998).*

*Primary Examiner* — Michael J Dalbo
*Assistant Examiner* — Denise R Karavias
(74) *Attorney, Agent, or Firm* — Kenneth Avila

(57) ABSTRACT

An apparatus and method to be used for the automated selection, inspection, analysis, and disposition of tools that are installed on milling drums used by an asphalt milling machine to remove a layer of asphalt from a road surface that is being resurfaced is disclosed. Asphalt milling machines are also known as cold planer, pavement planer, pavement recycler, or roto-mill machines. The disclosed apparatus and method comprises a robot, one or more 3-dimensional scanners, one or more digital 2-dimensional cameras, and a controller. A work surface is provided for where the robot may select a tool to be inspected, place the tool on a rotating pedestal, inspect the tool while rotating the tool to capture all aspects of the tool, perform an analysis on the images captured, and depending on the analysis, classify the tool as reusable, degraded, or scrap.

7 Claims, 16 Drawing Sheets

(56) References Cited

U.S. PATENT DOCUMENTS

| | | | |
|---|---|---|---|
| 2007/0111648 A1* | 5/2007 | Martel | A22B 5/007 452/118 |
| 2013/0002444 A1* | 1/2013 | Bitzel, Jr. | G01B 11/303 73/105 |
| 2016/0103050 A1* | 4/2016 | Fabrizius | G01N 3/56 356/630 |
| 2017/0011564 A1* | 1/2017 | Marsolek | E01C 23/088 |
| 2019/0080446 A1* | 3/2019 | Kuzmin | G06V 30/144 |
| 2019/0120770 A1 | 4/2019 | Chen et al. | |
| 2021/0023710 A1* | 1/2021 | Aloisio | B25J 9/1612 |
| 2021/0247756 A1* | 8/2021 | Hirman | G01N 3/56 |
| 2021/0294297 A1* | 9/2021 | Maushart | B23Q 17/2457 |
| 2022/0143771 A1* | 5/2022 | Andersen | B23Q 17/2457 |

FOREIGN PATENT DOCUMENTS

| | | |
|---|---|---|
| EP | 2558643 B2 | 12/2020 |
| JP | 2019163689 A | 9/2019 |
| WO | 2020043529 A1 | 3/2020 |

\* cited by examiner

AUTOMATED ANALYSIS AND SORTING OF MILLING DRUM TOOLS

CROSS-REFERENCE TO RELATED APPLICATIONS

This application claims priority from U.S. Provisional Patent Application No. 63/172,165 filed on Apr. 8, 2021. The entire disclosure of the prior application is considered to be part of the disclosure of the accompanying application and is hereby incorporated by reference.

BACKGROUND OF THE INVENTION

1. Field of the Invention

The present invention relates to the field of automated testing and analysis of wear and tear on tooling that is in use. More particularly, the present invention relates to an apparatus and respective method for determining the amount of wear on a tool that is part of a pick assembly that is attached to a milling drum and then sorting the tool depending upon the amount of wear present on the tool.

2. Description of the Related Art

The most commonly used material for surfacing a road is asphalt as it provides a long-lasting surface for the road at a lower cost than other materials. However, over time, an asphalted road becomes worn and uneven due to environmental situations such as temperature and moisture that cause the asphalt to break down and crack or simply due to general use by cars or heavy vehicles that may exacerbate environmental damage or cause the asphalt to become uneven. Thus it becomes necessary to perform maintenance on the deteriorated road surface in order to renovate the asphalt. Typically, an asphalted road surface is renovated by the removal of the top layer or region of asphalt. This is best performed by the use of an asphalt milling machine. FIG. 1 shows a typical asphalt milling machine. While there are many varieties, it is common for an asphalt milling machine to use milling drum 12 that contains, on its outer surface, pick(s) 28 assemblies to scrape away the top layer of asphalt that needs renovating as shown in FIG. 2. FIG. 4B shows pick(s) 28 assembly separated into its basic components: base block 42, tool holder 44, and tool 46.

Although the tools are manufactured with a hardened metal, with continuous use the tip of a tool will degrade to a point where it becomes so worn that it must be replaced. Thus the tools on a milling drum must be inspected regularly. This is a rather time-consuming process that requires trained personnel who can recognize when a tool must be replaced. This inspection process is subjective, requires the inspector to examine the full 360 degree exterior of each tool, and is prone to errors.

U.S. Pat. No. 10,416,056 to Sven Paulsen and others titled "Wear prognosis method and maintenance method" discloses an automated system for inspecting tools on a milling drum in an objective manner without the use of human inspectors. The Paulsen disclosure analyzes the tools while the tools are still mounted onto the milling drum and the milling drum is rotating under power from the asphalt milling machine. A camera is positioned within the milling chamber and as the milling drum is rotated, the camera scans the tips of the tools and calculates the amount of wear on each tool. After all of the tools have been scanned, an overall calculation of the effectiveness of the entire milling drum is performed to determine if the milling drum may be used for scraping operations or must be replaced. The Paulsen disclosure does not report the individual tools that need to be replaced. So once a milling drum has degraded to such a level that it must be replaced, the milling drum is removed and then each tool must be inspected by human inspectors to determine if they are to be replaced or not. Thus Paulsen does not alleviate the need for human inspectors to inspect each tool but at best delays the time when the human inspection is to be done.

Another disclosure, U.S. Pat. No. 11,209,812 to Colton Hirmand et al. titled "Methods and systems for tracking milling rotor bit wear" also performs automated inspection and analysis of tools on a milling drum. Hirmand discloses a method for determining part wear, such as using a wear model and includes receiving from a sensor, sensor data representing a surface of a tool on a milling drum. The method further includes determining an estimated time until a tool should be replaced. The method further includes batching together multiple tools that need replacing to enable a user to replace multiple tools in one maintenance period. The method may also include providing information to the user during the replacement of a worn tool to indicate the tool's location. As such, Hirmand overcomes problems with Paulsen in that individual tools that need to be replaced are identified and may be replaced even at the worksite. Since the tools are replaced while the milling drum is attached to the asphalt milling machine, the asphalt milling machine is not operational the entire time tools are inspected, and if necessary, replaced. This is time-consuming and costly as an asphalt milling machine is very expensive to purchase and maintain and is part of a greater operation involving other vehicles and crews.

It becomes apparent that there is an advantage to offload the analysis and inspection of tools on an asphalt milling machine away from the asphalt milling machine. It is not difficult for an operator of an asphalt milling machine to determine that the efficiency of the milling drum has degraded to the point where a replacement drum is needed. This may be done by instruments and sensors found on the asphalt milling machine that directly measure the output of the asphalt milling machine over time. Once the performance of the milling drum has degraded to a point, it is replaced in its entirety by a functional drum allowing the asphalt milling machine to become operational once again. The degraded milling drum may then be taken to a facility where the automated analysis may be performed. Additionally, such a facility may utilize additional sensors for the inspection process that may be difficult to install and maintain on the asphalt milling machine itself. Such a facility, with proper automation, may operate around the clock by the utilization of robots. The only human intervention required would be to remove the tools from the milling drum and place them into an incoming bin that is monitored by a robotic apparatus that selects a tool for inspection from the bin, inspects the tool, and then appropriately disposes of the tool.

BRIEF SUMMARY OF THE INVENTION

The invention of this disclosure comprises a robotic arm working in conjunction with one or more traditional 2 Dimensional (2D) cameras, one or more 3 Dimensional (3D) scanners, a rotating pedestal, an incoming bin containing tools to be inspected, and one or more outgoing bins to deposit the inspected tools. Each outgoing bin contains tools exhibiting similar amounts of degradation.

It is an objective of the invention of this disclosure to provide a robotic apparatus capable of monitoring an incoming bin containing tools that have been removed from an asphalt milling machine's milling drum for autonomous inspection, analysis, and disposition of the tools.

Another object of the invention of this disclosure is to provide a method for inspecting and analyzing a tool utilizing more than one type of sensor so as to improve the effectiveness of the inspection and analysis.

Another object of the invention of this disclosure is to provide a method for inspecting and analyzing a tool wherein the inspection and analysis includes more than one angular aspect of the tool.

Another object of the invention of this disclosure is to provide a method for inspecting and analyzing a tool wherein the inspection and analysis includes a scanner capable of creating a 3D map of the tool's surface.

Neither this summary nor the following detailed description defines or limits the invention. The invention is defined by the claims.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of apparatuses or methods comprising one or more embodiments of the disclosure. As such, the drawings are not meant to include all conventional features known by those of ordinary skill in the art to be required for the practice

DETAILED DESCRIPTION OF THE INVENTION

In the following specification and the claims, reference will be made to a number of terms, which shall be defined to have the following meanings.

The singular forms "a", "an", and "the" include plural references unless the context dictates otherwise.

Approximating language, as used herein throughout the specification and claims, may be applied to modify any quantitative representation that may permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application-specific integrated circuit, and other programmable circuits, and these terms are used interchangeably herein.

Further, as used herein, the terms "software", "firmware", and "flowchart" are interchangeable and include any computer program stored in memory for execution by personal computers, workstations, clients, controllers, and servers.

The apparatus and method described herein provide for the accurate analysis of the structural integrity of tools used on milling drums. Furthermore, the apparatus and method described herein allow for an accurate analysis of the potential failure points of those tools. Also, the apparatus and method described herein are not limited to any single predefined tool but may be implemented with a variety of tools.

Figure 1:
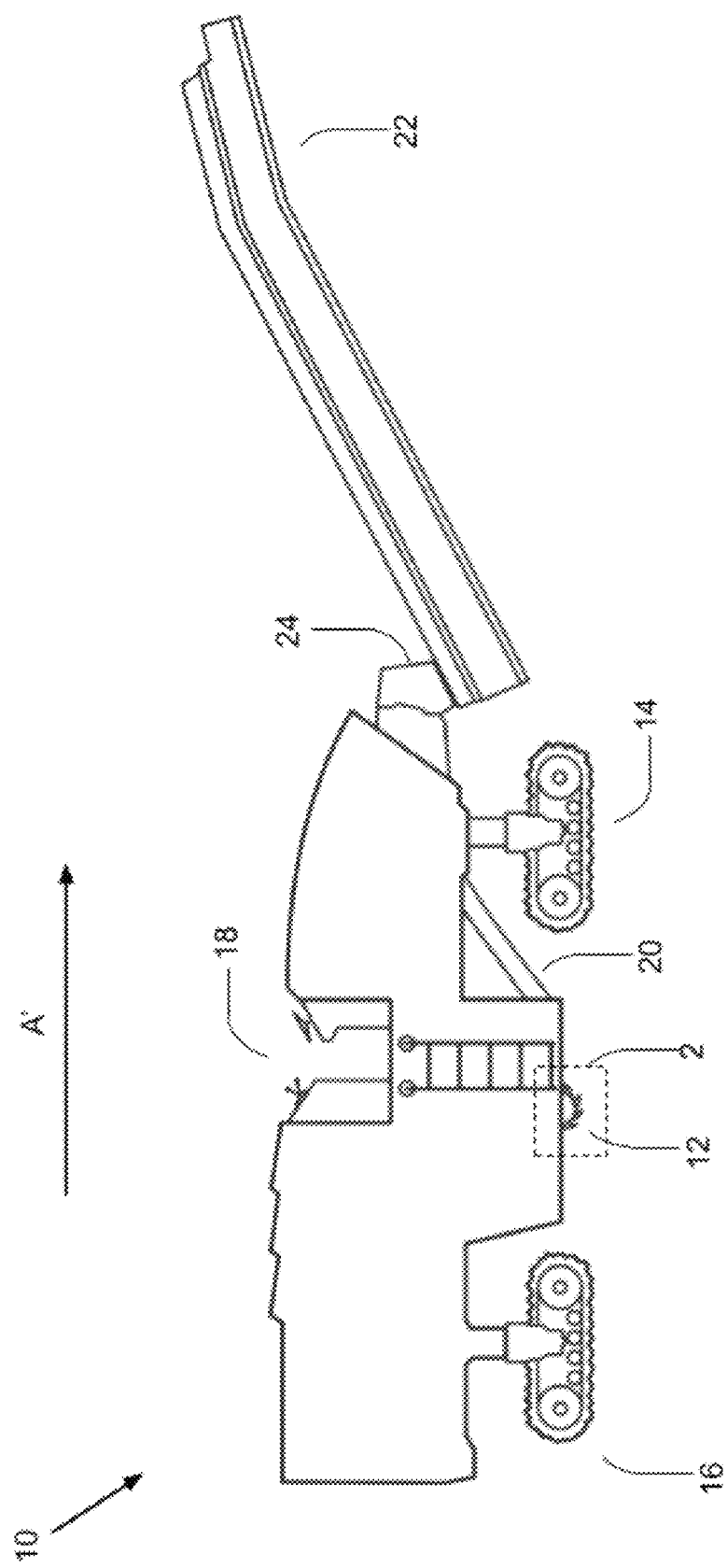
FIG. 1 shows a side elevation view of an asphalt milling machine that utilizes a milling drum to prepare the road for resurfacing.

FIG. 1 shows asphalt milling machine 10. An asphalt milling machine, also known as a cold planer, pavement planer, pavement recycler, or roto-mill, is used to remove a layer of bituminous pavement or asphalt concrete from roadways that are being resurfaced. Asphalt milling machine 10 is operated by an operator positioned at control station 18. The operator may navigate asphalt milling machine 10 by means of forward tracks 14 and rearward tracks 16 and control the rotational speed and height from the ground of milling drum 12. The purpose of milling drum 12 is to mill the top few inches of road surface 32 as determined by the operator. Material removed from road surface 32 by milling drum 12 is collected by primary conveyor 20 and then deposited onto secondary conveyor 22 at conveyor transition area 24. A truck, not shown in FIG. 1, travels before asphalt milling machine 10 and receives the material from secondary conveyor 22 so that it may be recycled and reused on road surfaces.

Figure 2:
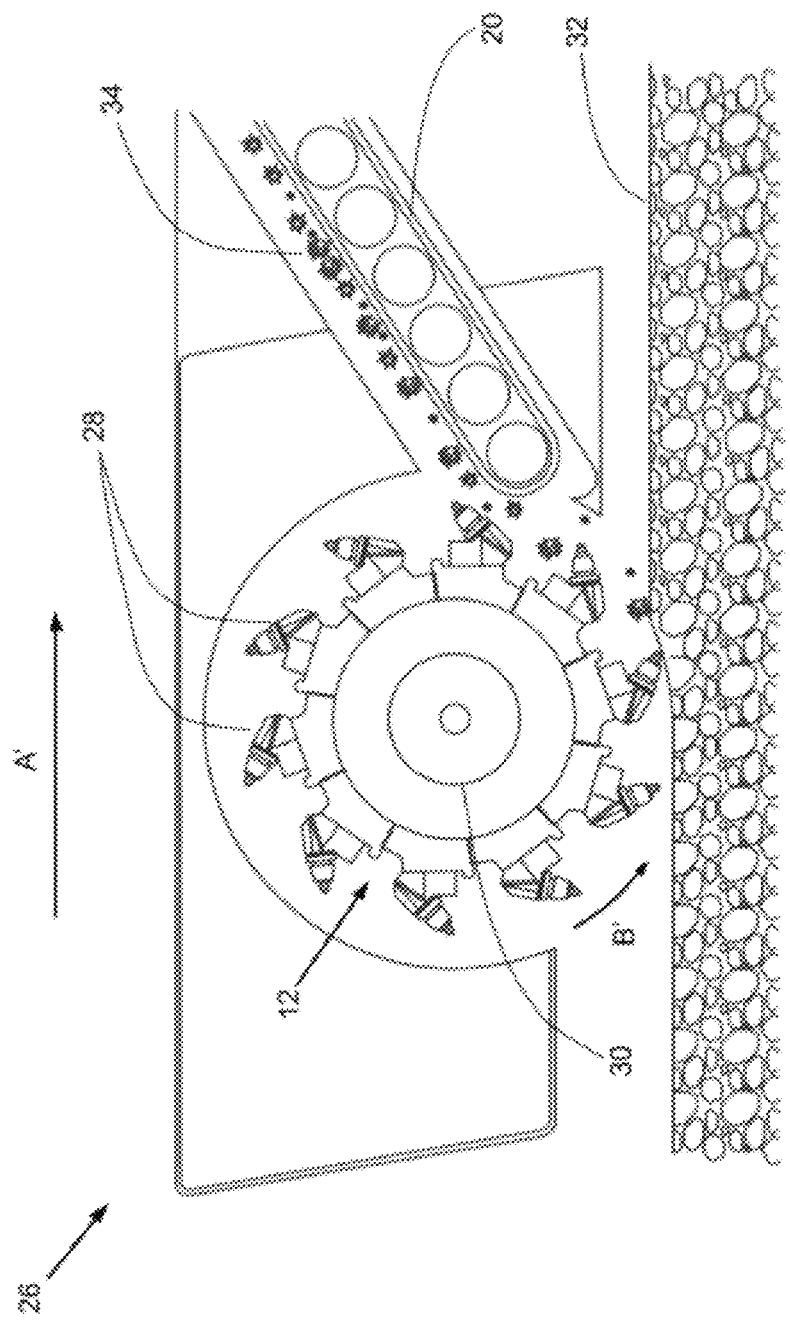
FIG. 2 shows an inset view of the milling chamber within the asphalt milling machine showing the milling drum in operation.
Figure 3A:
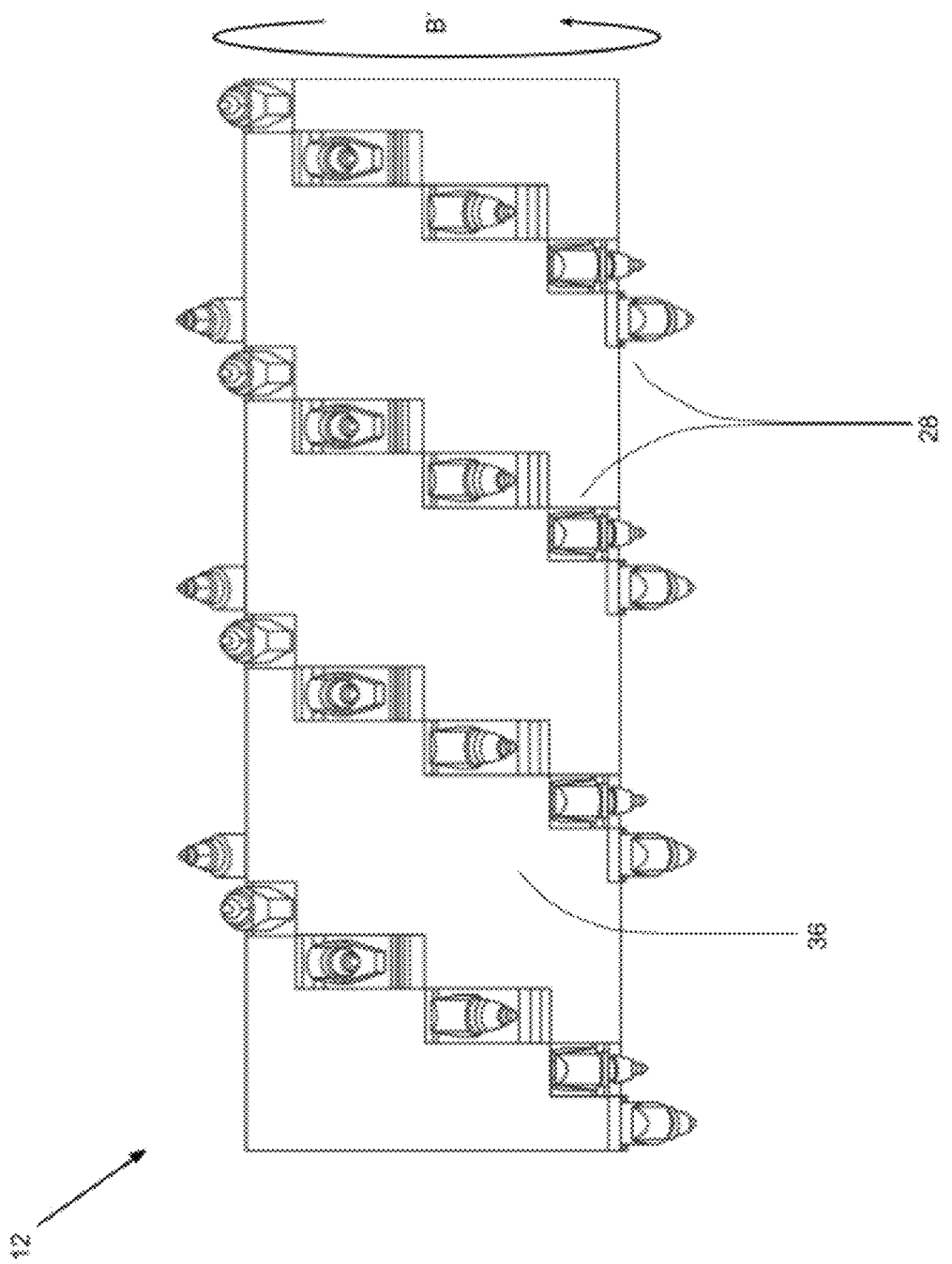
FIG. 3A shows a view of the milling drum used by the asphalt milling machine of FIG. 1 taken along its longitudinal axis. The number and arrangement of picks may vary from what is shown.
Figure 3B:
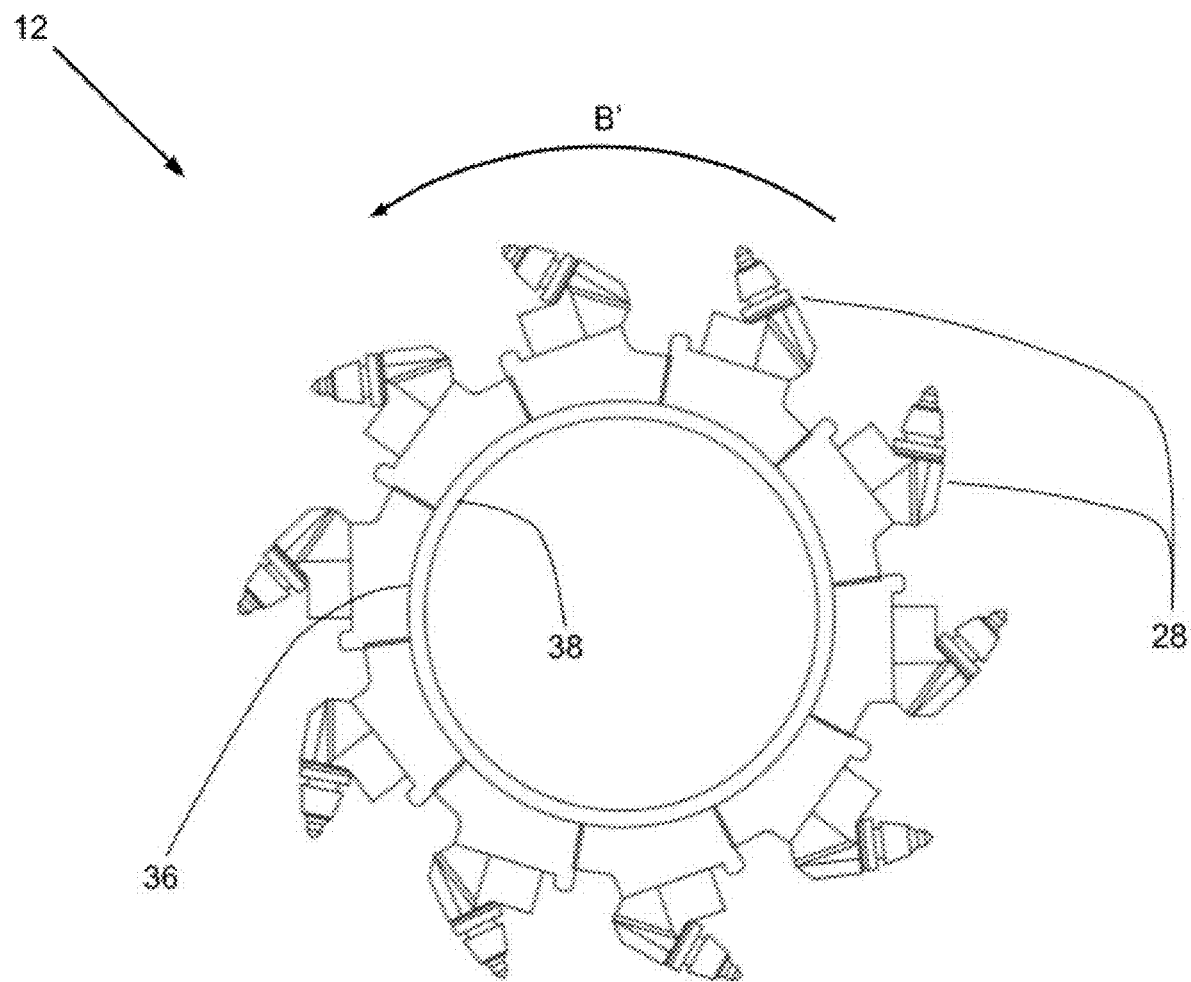
FIG. 3B shows a view of the milling drum used by the asphalt milling machine of FIG. 1 taken perpendicular to its longitudinal axis.
Figure 4A:
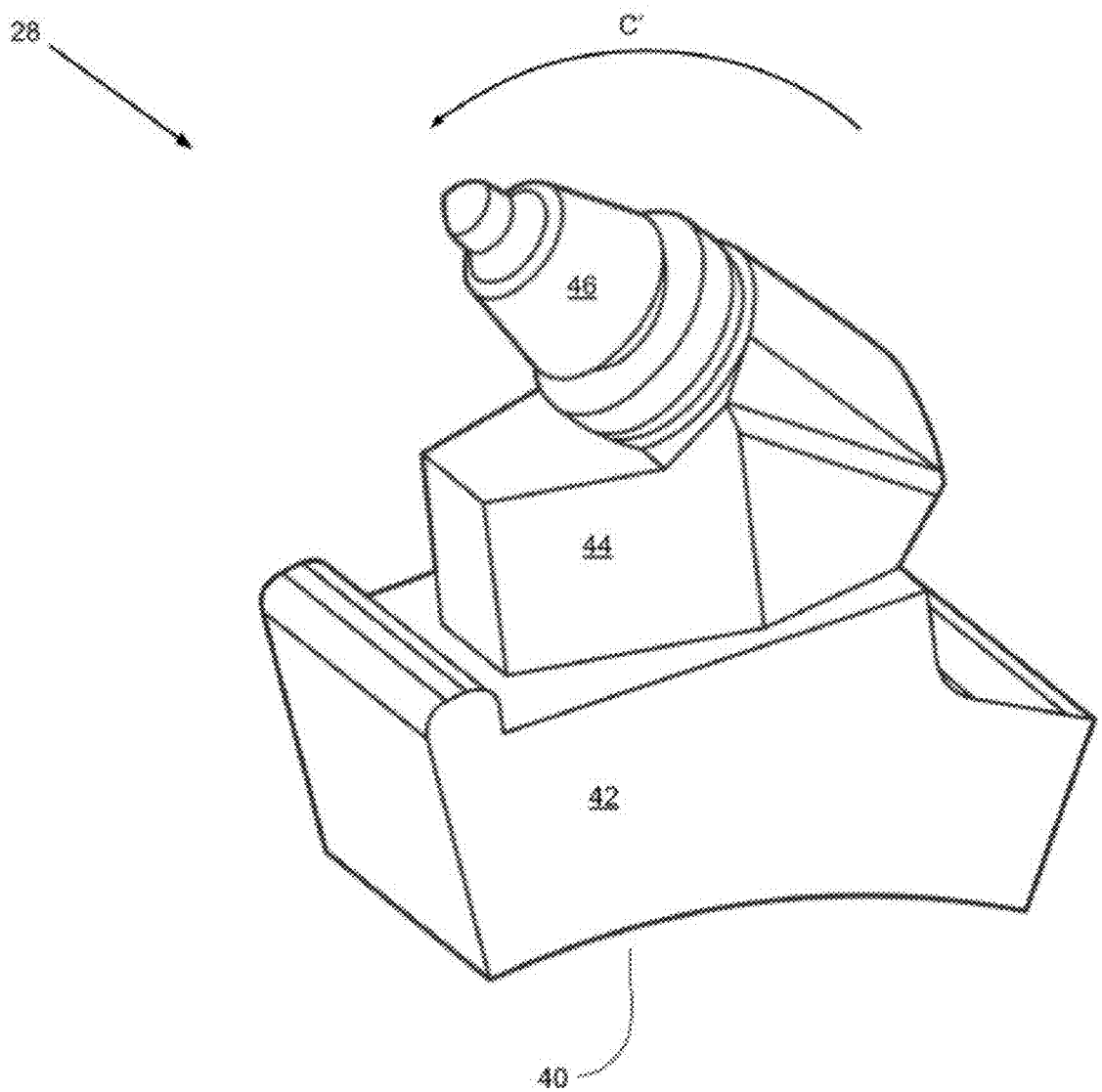
FIG. 4A shows a view of a single tool holder, containing a tool, of the milling drum shown in FIGS. 3A and 3B.
Figure 4B:
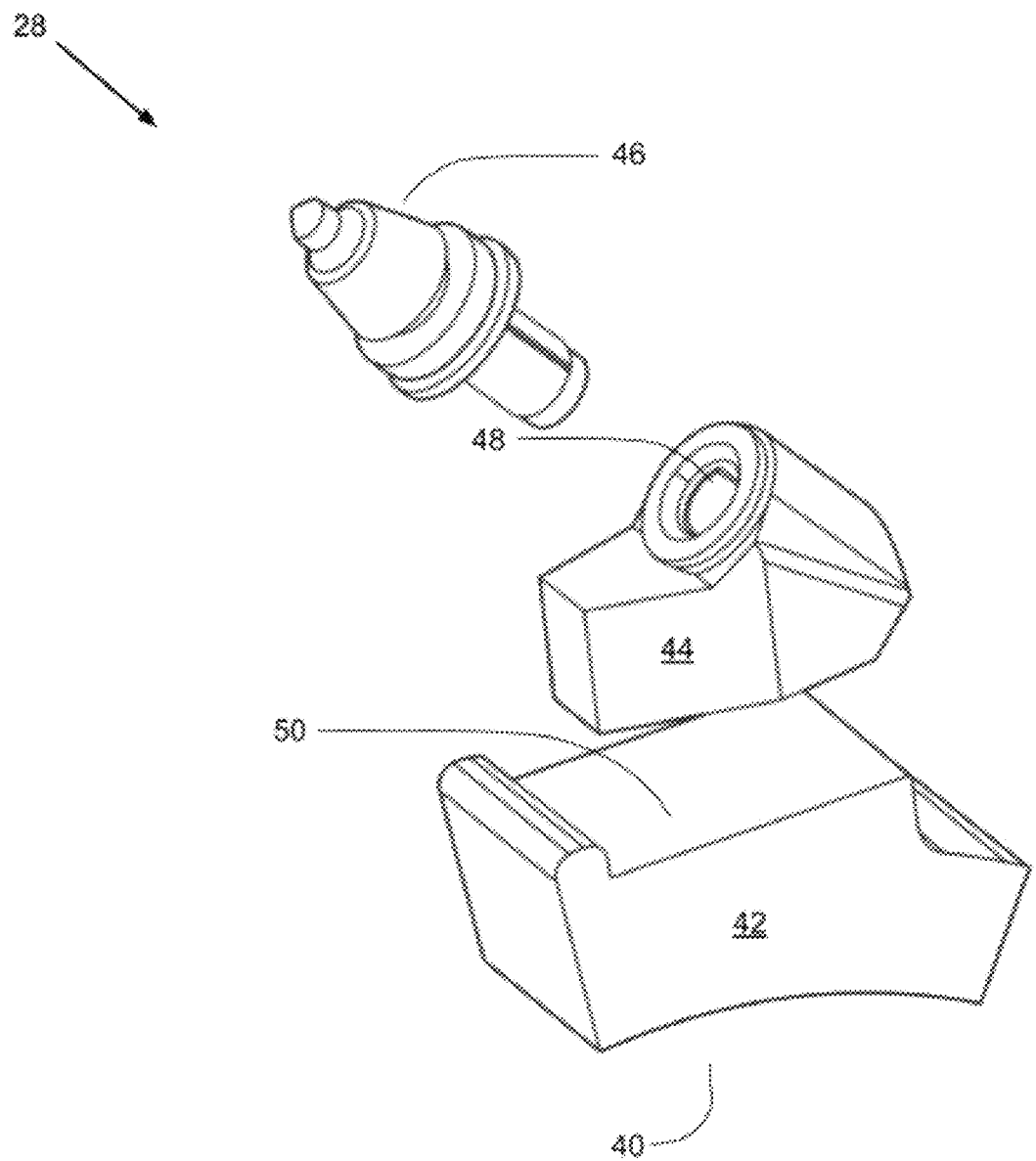
FIG. 4B shows an expanded view of the tool holder of FIG. 4A to illustrate its basic components.

FIG. 2 shows an inset view of milling chamber 26 showing milling drum 12 in operation. The direction of asphalt milling machine 10 is shown by A' while the rotational movement of milling drum 12 about axial 30 is shown as B'. About milling drum 12 are found multiple pick(s) 28 as shown in FIG. 3A and FIG. 3B. FIG. 4A shows a view of pick(s) 28 as assembled while FIG. 4B shows an exploded view of pick(s) 28. Pick(s) 28 consists of three basic components: base block 42, tool holder 44, and tool 46. In such a design, an entire pick does not need to be replaced when one component has become fatigued or damaged. This is particularly advantageous as usually it is tool 46 that needs to be replaced and not base block 42 or tool holder 44. Thus the fatigued or damaged tool 46 may be removed and replaced with a fresh tool 46. As milling drum 12 rotates in the direction of B', pick(s) 28 engages and penetrates road surface 32 by means of tool 46. The height of milling drum 12 may be adjusted to determine the degree of engagement between pick(s) 28 and road surface 32. The material that has been removed from road surface 32 by pick(s) 28 is referred to as aggregate 34. The rapid rotational movement of milling drum 12 causes aggregate 34 to be driven into the air and caught by primary conveyor 20. Aggregate 34 is then moved by primary conveyor 20 into conveyor transition area 24 and then onto secondary conveyor 22 where aggregate 34 is then dropped into the bed of a dump truck to be transported to a recycling facility. At the recycling facility, aggregate 34 is recycled to be reused as material for new road surfaces or to repair existing road surfaces. As pick(s) 28 engages road surface 32 with tool 46, the ability of tool 46 to remove material from road surface 32 degrades. At some point, tool 46 is degraded to the point where it is no longer functional and must be replaced.

FIG. 3A shows a frontal view of milling drum 12 with pick(s) 28 arranged in a somewhat spiral arrangement about the outer surface 36 of milling drum 12. Not all milling drum 12 utilize such an arrangement of pick(s) 28 and there may be greater or fewer number of pick(s) 28 present on the outer surface 36 of milling drum 12. When in operation, milling drum 12 will rotate in the direction indicated by B'. In this manner, while asphalt milling machine 10 is stationary or moving forward, tool 46 on pick(s) 28 will engage road surface 32. FIG. 3B shows a side sectional view of milling drum 12. When combined with FIG. 3A it is seen that milling drum 12 is basically of a hollow cylinder construction having inner surface 38, outer surface 36, and an arrangement of pick(s) 28 about outer surface 36.

FIG. 4A provides a detailed view of pick(s) 28. Pick(s) 28 basically consists of three components, base block 42, tool holder 44, and tool 46. The lower surface of base block 42 conforms to the shape of outer surface 36 found on milling drum 12 and is attached thereto by any number of means that are well known in the art. The directional movement of pick(s) 28 is indicated by C'. FIG. 4B shows the three components of pick(s) 28 as in FIG. 4A but they are shown as separate from one another. In particular, FIG. 4B shows tool insertion cavity 48 in tool holder 44 where tool 46 is attached to pick(s) 28.

Figure 4C:
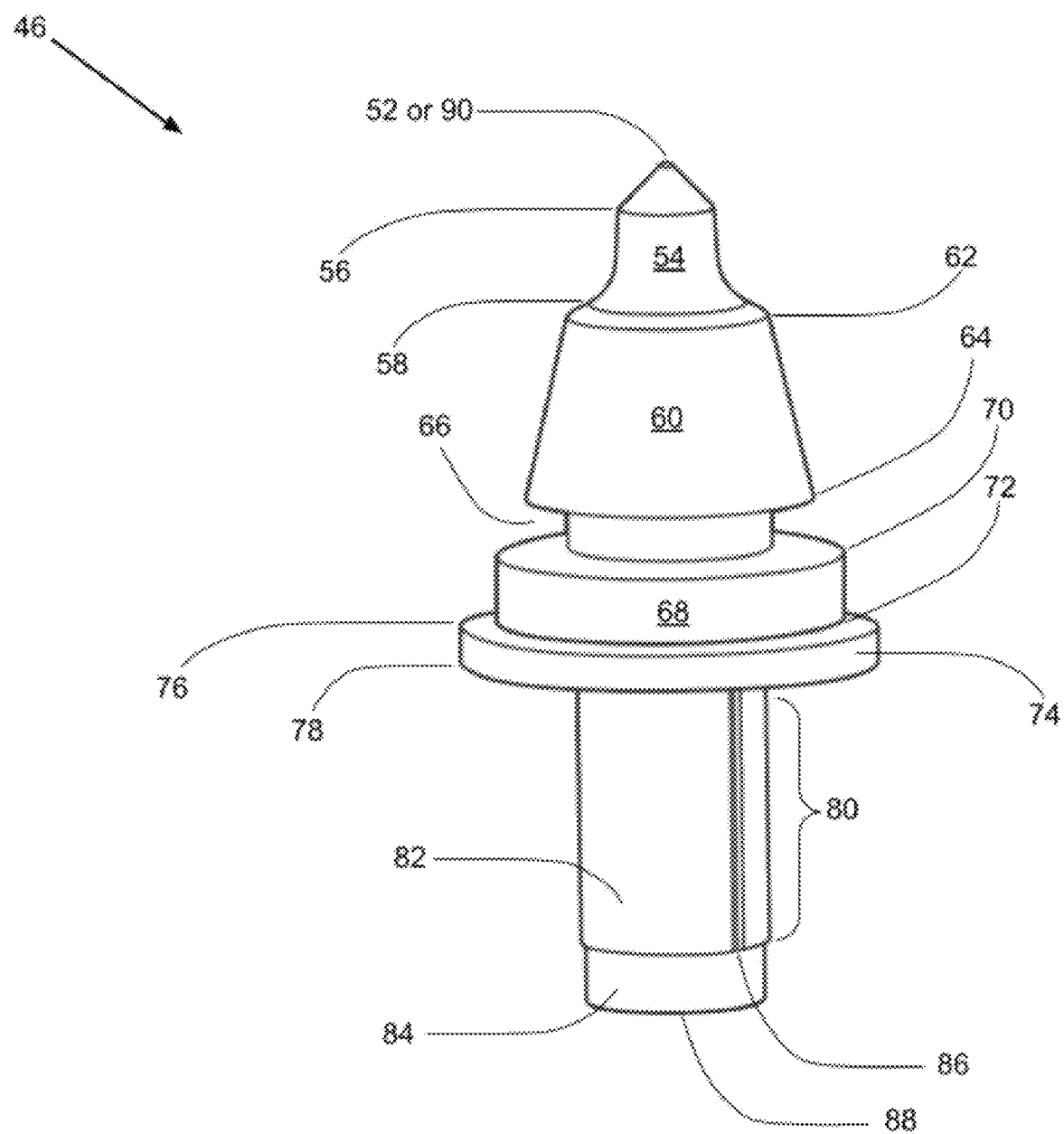
FIG. 4C shows the tool of the tool holder shown in FIG. 4A and FIG. 4B, and its various features.

FIG. 4C provides a detailed view of tool 46. Tool 46 is symmetrical along its longitudinal axis and is adapted to fit into tool insertion cavity 48 by means of post 80. Tool 46 has a distal end 90 and a proximal end 88. At distal end 90 is found tip 52 which is the primary element of tool 46 used in breaking up road surface 32. Tip region 54 comprises the area from tip 52 to tip skirt 58 and includes tip crown 56. It is important to monitor tip region 54 for fatigue. As tool 46 is used, tip region 54 loses material and becomes deformed to the point where it is no longer effective at milling road surface 32 and must be replaced. Autonomous workstation 92, shown in FIGS. 5A and 5B, may analyze tip region 54 with 3D scanner 102 and 2D camera 104, to determine a number of parameters of tool 46. These parameters include the height of tool 46, the diameter and roundness of tip crown 56, and the diameter and roundness of tip skirt 58.

When continuing towards proximal end 88, below tip region 54, is body region 60. Body region 60 is roughly in the shape of a trapezoidal cylinder and comprises the area from body crown 62 to body skirt 64. The primary purpose of body region 60 is to follow tip region 54 into road surface 32. As body region 60 is of a larger diameter than tip region 54, a greater amount of road surface 32 is milled after being initially broken up by tip region 54. It is important to monitor body region 60 for fatigue. As tool 46 is used, body region 60 loses material and becomes deformed to the point where it is no longer effective at milling road surface 32 and must be replaced. Autonomous workstation 92, by analyzing body region 60 with 3D scanner 102 and 2D camera 104, may determine the diameter and roundness of body crown 62 and the diameter and roundness of body skirt 64.

Continuing further towards proximal end 88, below body region 60, is groove 66. Groove 66 appears as a cylindrical inset perpendicular to the longitudinal axis of tool 46. Groove 66 provides a form wherein a compatible tool may be inserted to assist in removing tool 46 from tool holder 44. As groove 66 is protected from fatigue by body region 60 it is unlikely that groove 66 would experience any fatigue. However, if there has been material loss within groove 66, it is important to reject tool 46 from future use as body region 60 may become detached. This will render tool 46 useless for any milling operations. Autonomous workstation 92, by analyzing the width of groove 66 at multiple aspects with 2D camera 104, may determine if groove 66 has undergone any material loss.

Continuing further towards proximal end 88, below groove 66, is pad region 68. Pad region 68 extends circumferentially from tool 46 and comprises the area from pad crown 70 to pad skirt 72. The primary purpose of pad region 68 is to distribute the amount of surface area between tool 46 and washer 74. During operation, tool 46 is subjected to large accelerative forces. These forces are communicated to tool holder 44 and over time will damage tool holder 44 and require its replacement. This is a far more costly alternative than just replacing tool 46. As pad region 68 distributes these accelerative forces upon washer 74, damage to tool holder 44 is minimized. By distributing those forces across the surface of washer 74, the amount of fatigue at the juncture of tool 46 and washer 74 is reduced. Autonomous workstation 92, by analyzing pad region 68 with 3D scanner 102, may determine the diameter and roundness of pad crown 70. Autonomous workstation 92, by analyzing pad region 68 with 2D camera 104, may determine the diameter of pad skirt 72 as well as the height of pad region 68.

Continuing towards proximal end 88, below pad region 68, is post 80. Post 80 is in the form of a cylinder and extends axially from pad region 68 to proximal end 88 where lip 84 is found. The primary purpose of post 80 is to attach tool 46 to tool holder 44. Comprising post 80, at its proximal end 88, is lip 84 which extends circumferentially from post 80. The primary purpose of lip 84 is to provide a means to secure retainer clip 82 to post 80. Retainer clip 82 is a hollow cylinder that encloses post 80 except for gap 86 and is used to secure tool 46 within tool insertion cavity 48. In retainer clip 82 normal state, the outer diameter of retainer clip 82 is slightly larger than the diameter of lip 84. When retainer clip 82 is compressed and the distance across gap 86 is decreased, the diameter of retainer clip 82 is equal to the diameter of lip 84. When the diameter of retainer clip 82 is expanded, thereby increasing the distance across gap 86, retainer clip 82 may pass over lip 84 when inserting or removing retainer clip 82 onto post 80. To insert tool 46 into tool insertion cavity 48, retainer clip 82 must be compressed. Once tool 46 has been inserted into tool insertion cavity 48, retainer clip 82 will attempt to expand back to its original state but will come into contact with the inner wall of tool insertion cavity 48 to form a friction fit. Retainer clip 82 should be made from a material that is somewhat flexible to allow retainer clip 82 to be expanded and compressed and yet return to its pre-formed shape. A material such as spring steel or the like would be appropriate. The inner diameter of retainer clip 82, in its normal state, is slightly larger than the outer diameter of post 80. This allows tool 46 to rotate about its axis while milling drum 12 is in operation. In doing so, tool 46 wears more evenly thereby increasing the operational lifespan of tool 46. Autonomous workstation 92, by analyzing post 80 with 2D camera 104, may determine if retainer clip 82 is present on post 80 as required.

Finally, washer 74 establishes a mechanical interface between tool 46 and tool holder 44 and is installed by slipping washer 74 over lip 84 onto post 80. The primary purpose of washer 74 is to distribute the accelerative forces operating on tool 46 to a greater area on tool holder 44. If washer 74 is not present or has been compromised, tool holder 44 will fatigue resulting in the need to replace tool holder 44 more often than otherwise. Autonomous workstation 92, by analyzing washer 74 with 3D scanner 102, may determine the roundness and diameter of washer 74. Autonomous workstation 92, by analyzing washer 74 with 2D camera 104, may determine the structural integrity of washer 74.

Figure 4D:
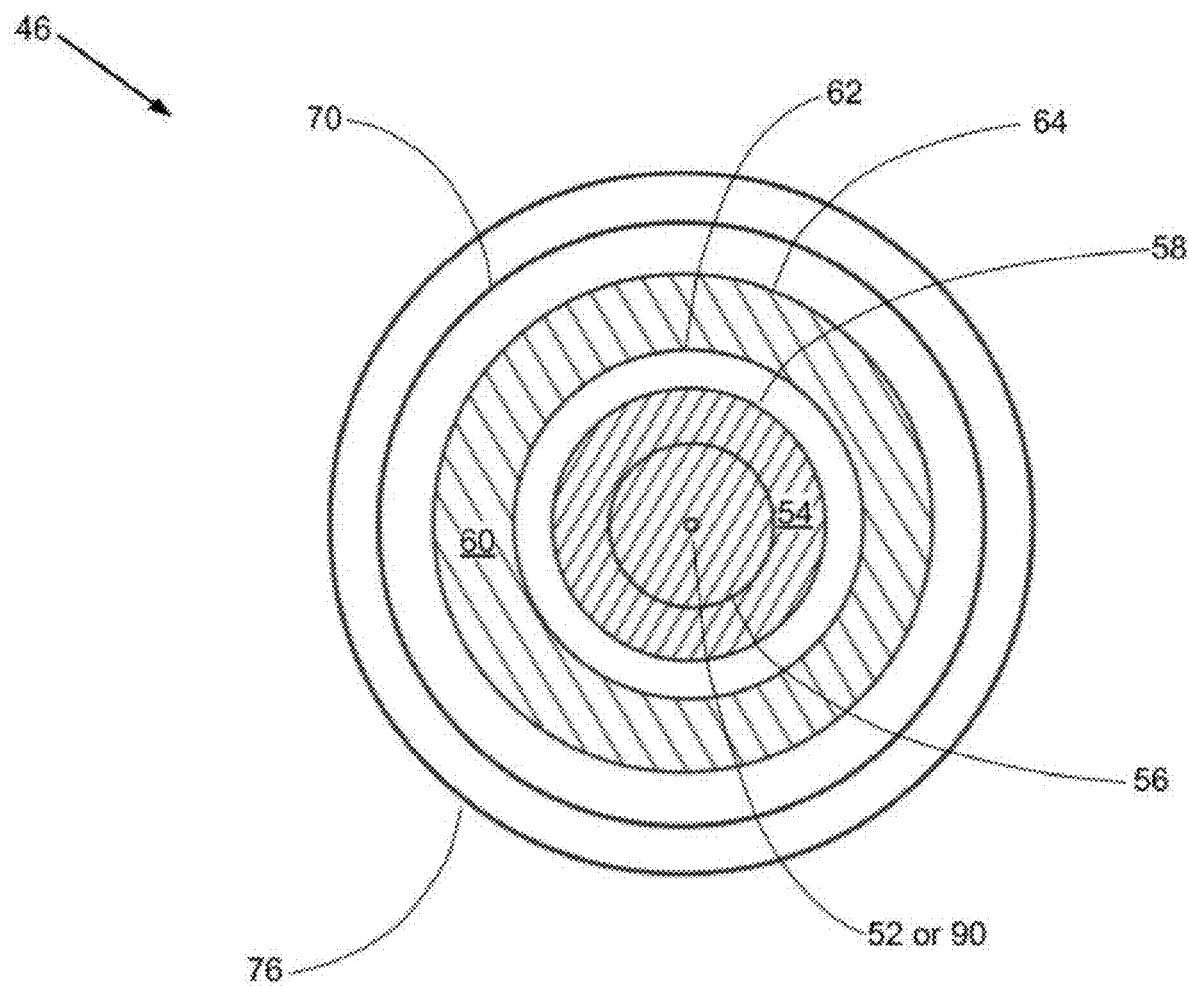
FIG. 4D shows a top view of the tool shown in FIG. 4C and its various features are visible from the top view.

FIG. 4D shows a top view of tool 46 as seen by 3D scanner 102. In FIG. 4D, tip region 54, body region 60, and pad region 68 are shown with varying hatch marks. By using 3D scanning techniques, 3D scanner 102 is able to create what is referred to as a "cloud of points" of the upper surfaces of tool 46 as shown here in FIG. 4D. In turn, controller 108 may analyze this cloud of points and identify tip region 54, body region 60, pad region 68, and other features of interest on tool 46.

Figure 5A:
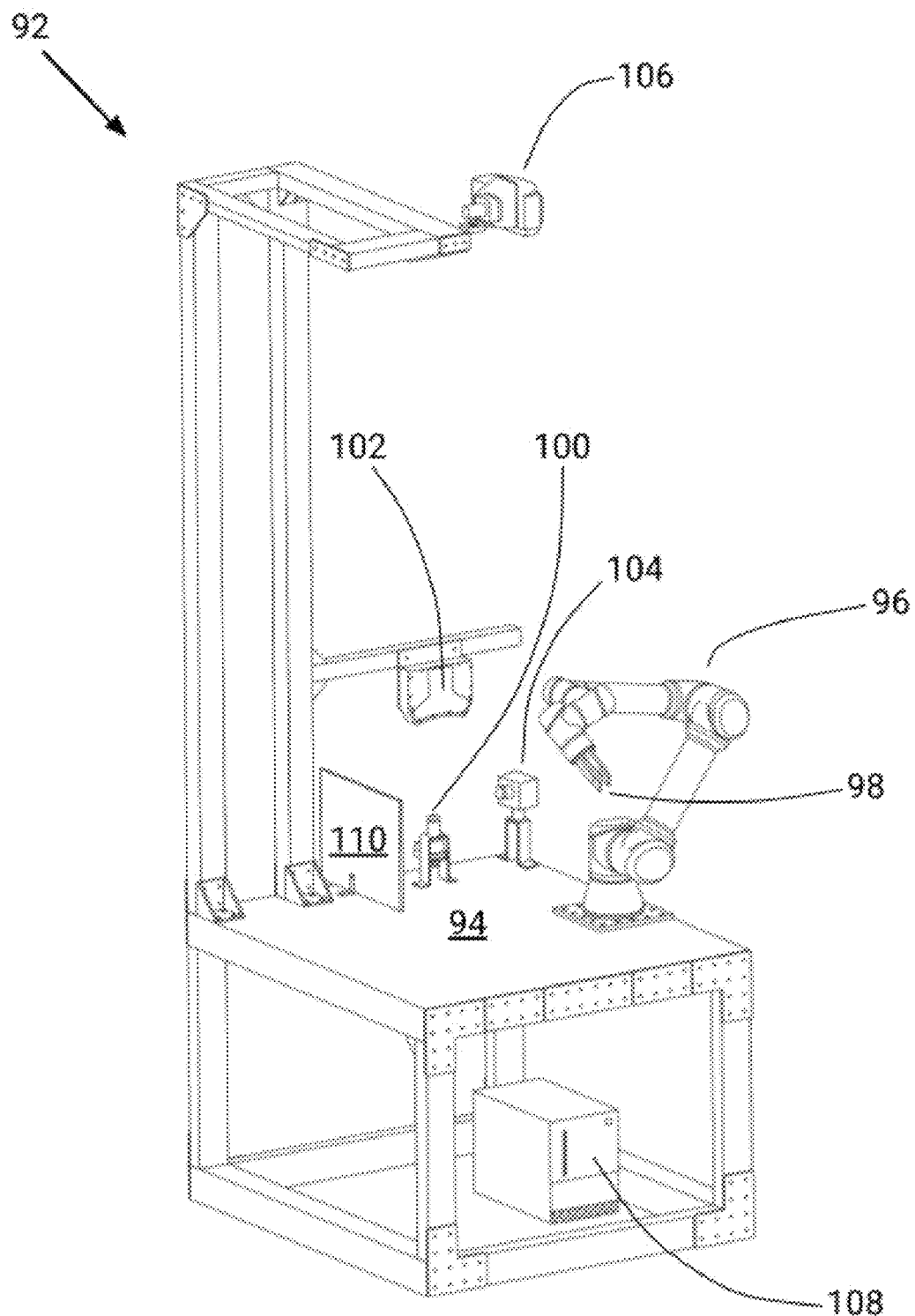
FIG. 5A shows the autonomous workstation of an embodiment of the present invention. The incoming bin of tools to be inspected and the outgoing bins of inspected and determined tools are not shown for clarity.
Figure 5B:
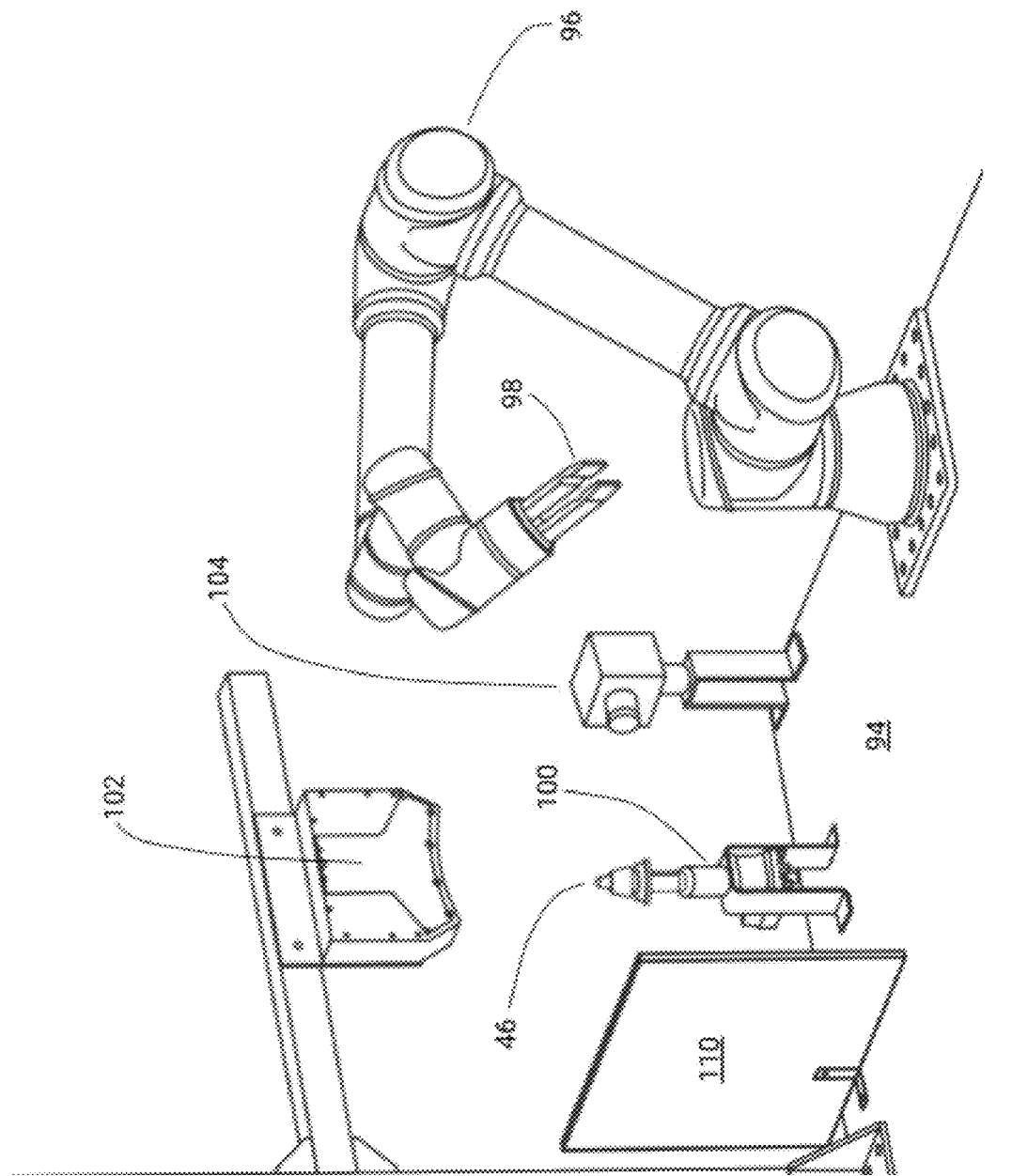
FIG. 5B shows the components on the work surface of the autonomous workstation in FIG. 5A.

FIG. 5A shows autonomous workstation 92 of the present invention while FIG. 5B shows greater detail of its work surface. Autonomous workstation 92 consists of a table-like structure having a work surface 94 set on four legs or some other suitable stand. On work surface 94 is attached robot arm 96 having a range of motion comprising six degrees of freedom and is able to pick up and manipulate objects lying on work surface 94 or nearby. At the distal end of robot arm 96 are two fingers 98 which are used by robot arm 96 to grasp a tool 46 for inspection or for disposition. Although robot arm 96 is shown attached to the table, robot arm 96 may be attached to another fixed location as long as robot arm 96 has access to work surface 94 of autonomous workstation 92. Also affixed to work surface 94 is rotating platform 100 upon which robot arm 96 places tool 46. Once tool 46 is placed on rotating platform 100, rotating platform 100 may rotate tool 46 a full 360 degrees. In this manner, 2D camera 104 may record a sequence of images, perpendicular to the longitudinal axis of tool 46, for analysis by controller 108. Tool 46 does not have to be rotated 360 degrees by rotating platform 100. If the analysis done by controller 108 determines that tool 46 is scrap before tool 46 has been fully rotated, testing may stop. Moreover, since only the outline of tool 46 is being considered, tool 46 need only be rotated 180 degrees for an accurate determination to be made of tool 46 degradation. For 2D camera 104 to provide controller 108 with optimal images that clearly show the edges of tool 46, white backdrop 110 is used. Above rotating platform 100 is found 3D scanner 102 which may image tool 46 and thereby creating a cloud of points depicting the upper surfaces of tool 46 as discussed above with FIG. 4D. Images created by 2D camera 104 and 3D scanner 102 are analyzed by controller 108 to determine the degree of the structural integrity of tool 46 that is under inspection. Finally, 3D picking scanner 106 is positioned above the incoming bin to scan incoming bin for the presence of any tool 46. Once autonomous workstation 92 has completed the analysis of tool 46, tool 46 may be categorized (i) as reusable on milling drum 12 because a sufficient degree of its structural integrity has been maintained, (ii) as reusable for other operations, such as mixing aggregate, because the degree of it structural integrity tool 46 is degraded, or (iii) as scrap material because the degree of its structural integrity is lacking. What is not shown in FIG. 5A or FIG. 5B are mechanisms to transport tool 46 to autonomous workstation 92 for inspection and mechanisms to receive from autonomous workstation 92, tool 46 that have been inspected and must be disposed of which is not part of this disclosure.

Figure 6A:
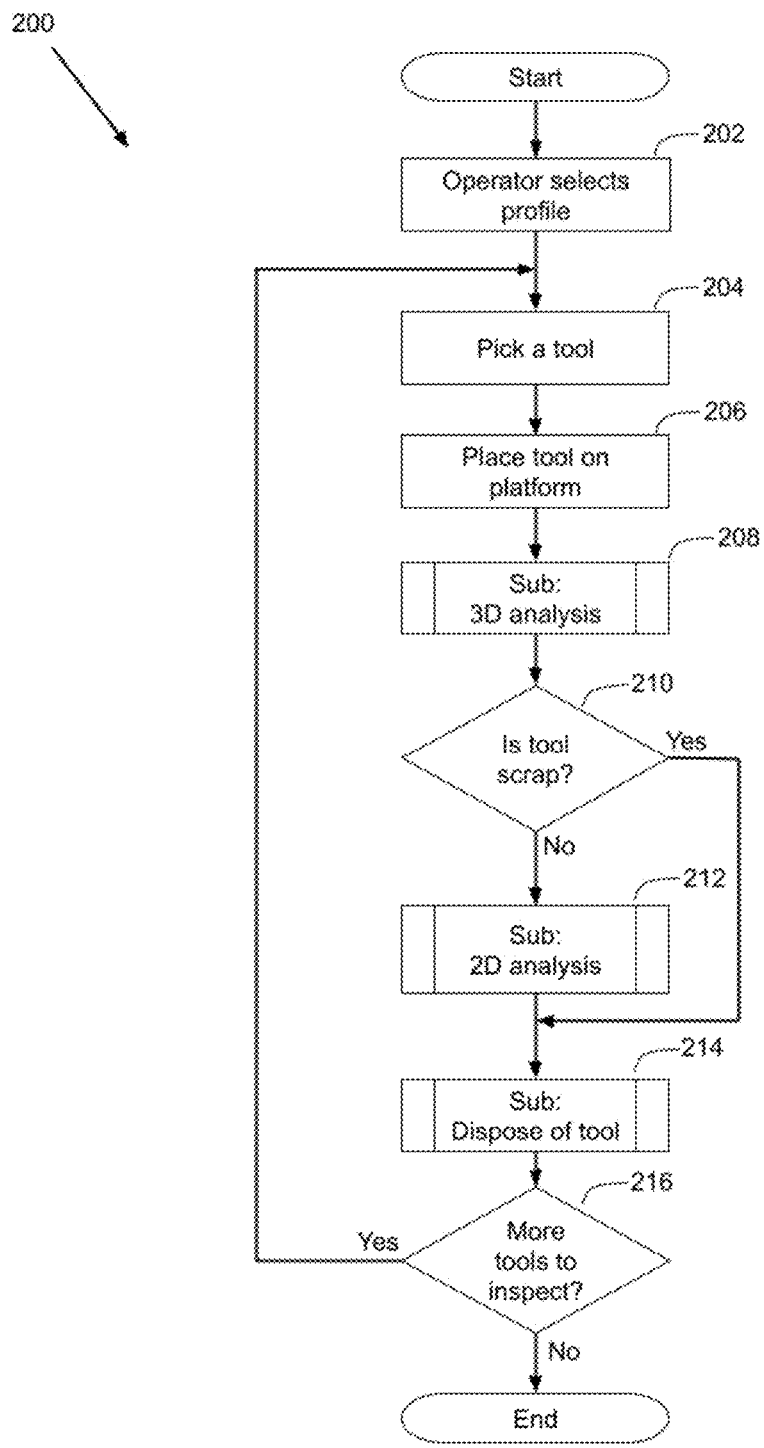
FIG. 6A presents a flowchart depicting an embodiment of the main control loop of the software controlling the autonomous workstation of FIG. 5A and FIG. 5B.
Figure 6B:
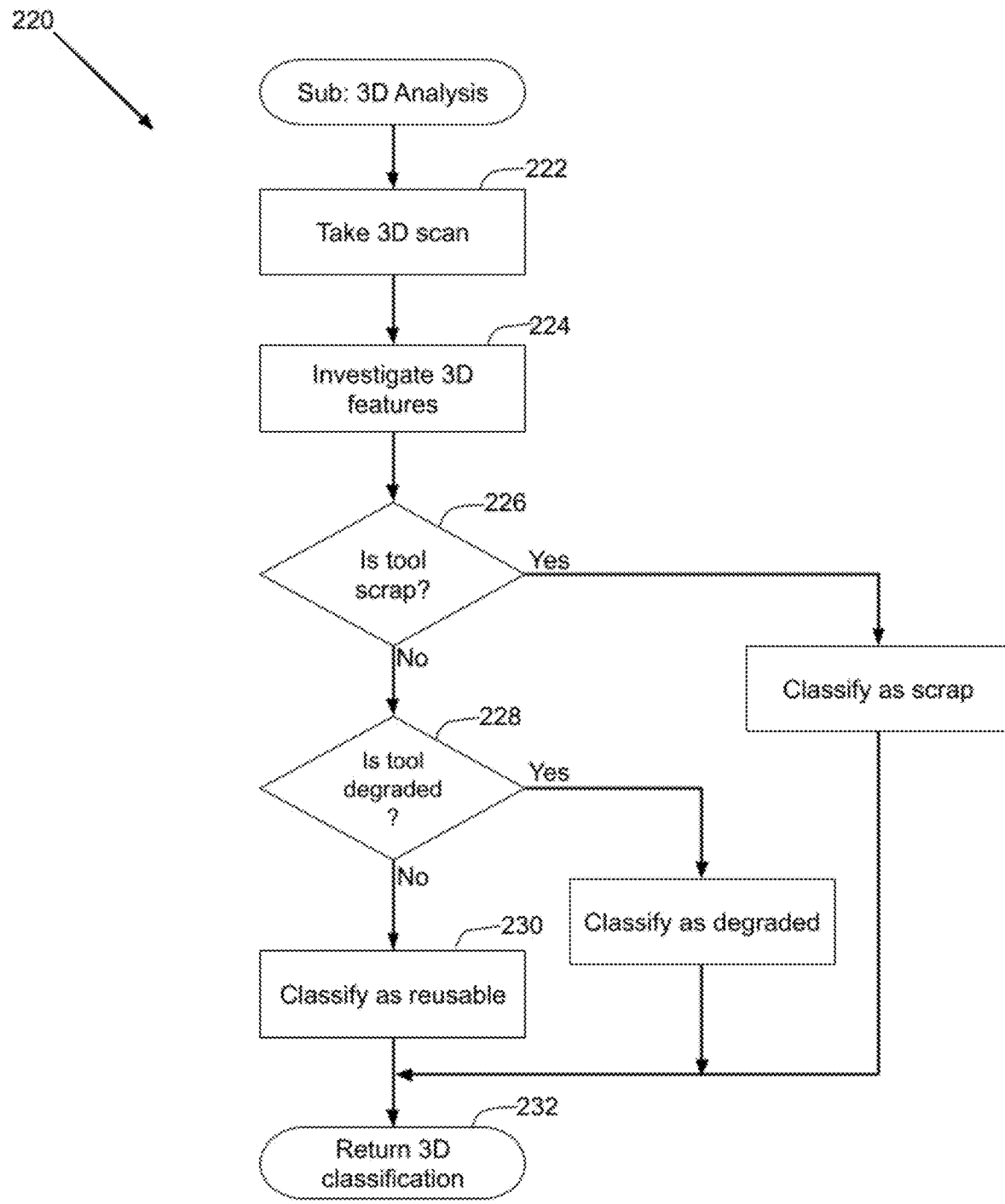
FIG. 6B presents a flowchart depicting an embodiment of the subroutine that performs a 3D analysis of the tool being inspected.
Figure 6C:
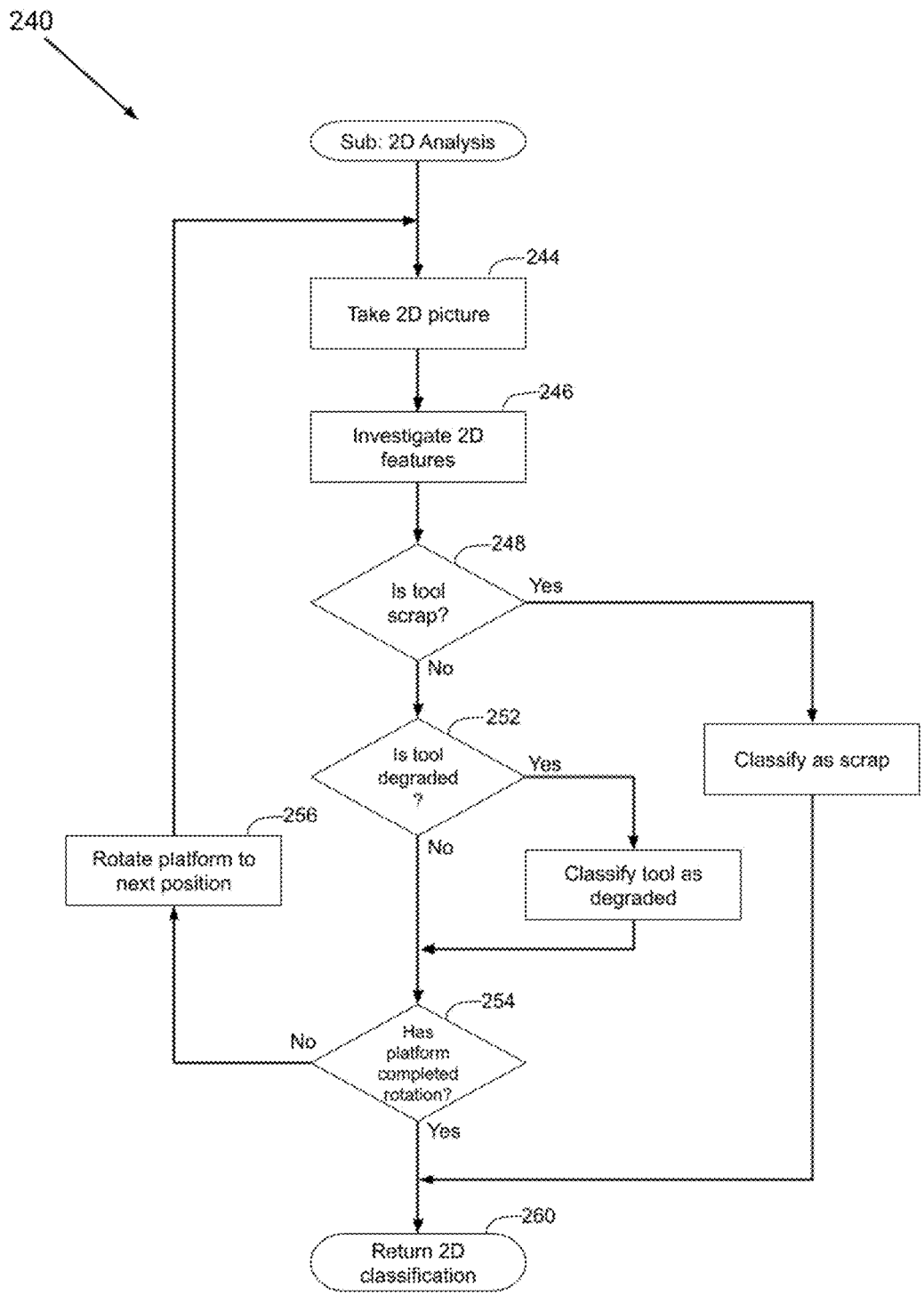
FIG. 6C presents a flowchart depicting an embodiment of the subroutine that performs a 2D analysis of the tool being inspected.
Figure 6D:
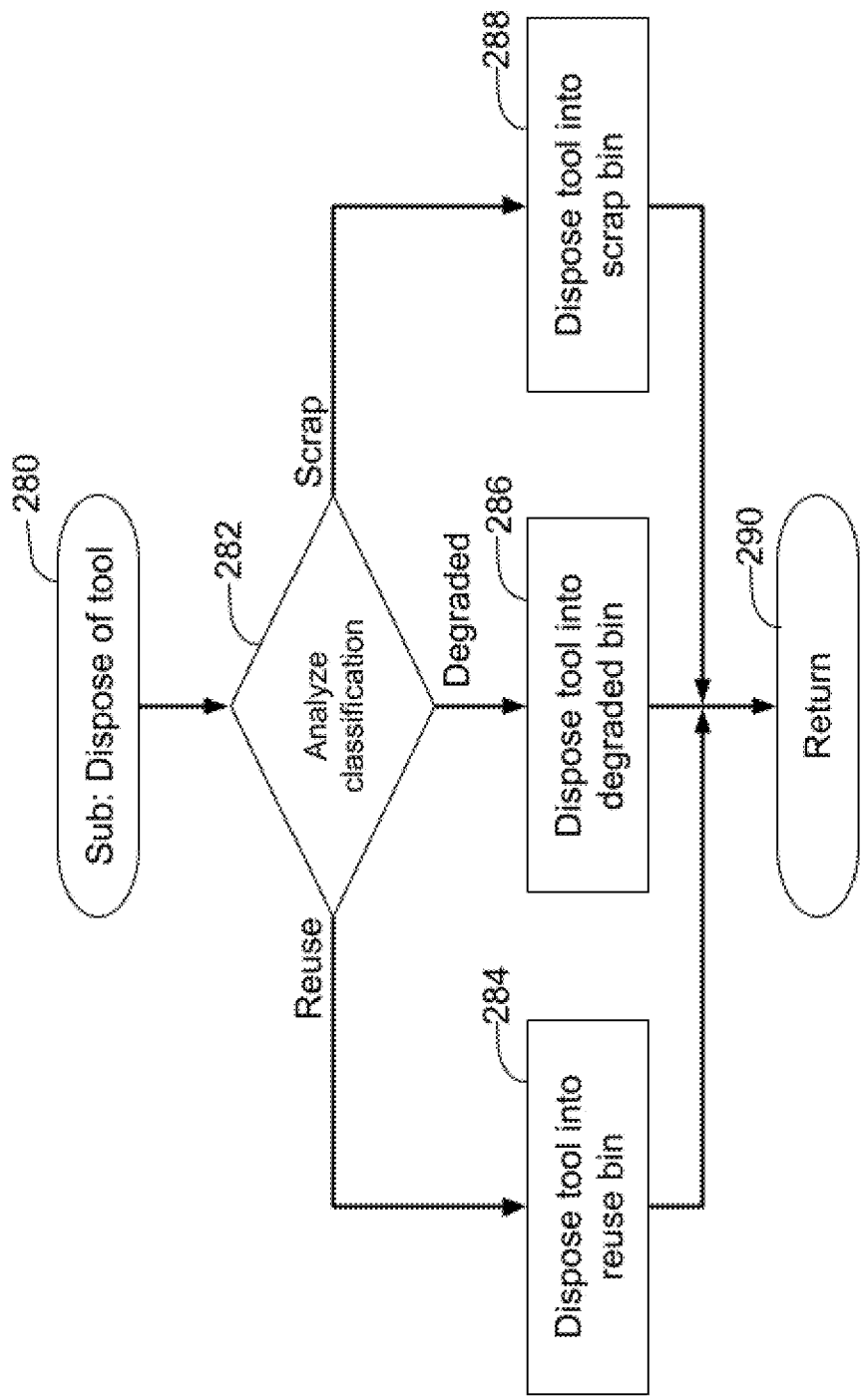
FIG. 6D presents a flowchart depicting an embodiment of the subroutine that disposes of a tool after it has been inspected.

Controller 108 controls and interacts with robot arm 96, 3D picking scanner 106, 3D scanner 102, 2D camera 104, and rotating platform 100 in order to manipulate and analyze the tools that are to be inspected. FIGS. 6A, 6B, 6C, and 6D all present flowcharts that depict the interaction between these components of autonomous workstation 92. FIG. 6A presents main control loop 200 while FIGS. 6B, 6C, and 6D present subroutines that are called by main control loop 200 in FIG. 6A.

After performing any initialization and start-up processes, controller 108 enters main control loop 200 presented in FIG. 6A. In step operator selects profile 202, the operator of autonomous workstation 92 selects the profile of tool 46 that are to be inspected. Autonomous workstation 92 is capable of analyzing the structural integrity of different types of tool 46. Although manufacturers of tool 46 have standardized how a tool removably connects with tool holder 44, in particular, washer 74 with post 80 surrounded by retainer clip 82, the structure of the portion of the tool above washer 74 may vary from one manufacturer to another. A tool's groove 66, body region 60, and tip 52 may, for example, vary in diameter, length, and contour. Each type of tool has a profile that contains all of the features, or attributes, of the tool that are to be inspected by 3D scanner 102 and 2D camera 104 and collectively they are referred to as features of interest. The features of interest that are to be captured by 3D scanner 102 are described in Table 2 and the features of interest that are to be captured by 2D camera 104 are described in Table 3. In step pick a tool 204, controller 108 interacts with 3D picking scanner 106 to scan the bin holding incoming tools and identifies the location of the post for the next tool to be inspected. The coordinates are sent by controller 108 to robot arm 96 along with a command to pick up the identified tool by its post. Robot arm 96 will then retrieve the identified tool. In step place tool on platform 206, controller 108 will command robot arm 96 to (1) place the tool on rotating platform 100 so that the post of the tool is on rotating platform 100 and the tip of the tool is pointing to 3D scanner 102 and then (2) withdraw itself from rotating platform 100. In step 3D analysis 208, main control loop 200 will call 3D analysis subroutine 220 presented in FIG. 6B. Here controller 108, in conjunction with 3D scanner 102, will perform a 3D analysis of the tool under inspection and return information as to the classification of the tool as either reusable, degraded, or scrap. In step is tool scrap 210, if the tool is found to be scrap, the flow is directed to bypass any further analysis so that the tool may be disposed of, otherwise the flow continues to the next step. In step 2D analysis 212, main control loop 200 will call 2D analysis subroutine 240 presented in FIG. 6C. Here controller 108, in conjunction with 2D camera 104 and rotating platform 100, will then perform a 2D analysis at multiple angular aspects of the tool under inspection and return information as to the classification of the tool as either reusable, degraded, or scrap. In step dispose of tool 214, controller 108 will analyze the classification of the tool from the 3D and 2D analysis and dispose of the tool so that (1) it may be reused on a milling drum 12, (2) it may be reused for a purpose other than milling road surface 32, or that (3) it may no longer be used for any purpose and must be scrapped. After the tool has been disposed of in step dispose of tool 214, in step more tools to inspect 216, controller 108 will work in conjunction with 3D picking scanner 106 to determine if there is another tool awaiting inspection. If another tool is awaiting inspection, main control loop 200 repeats. Otherwise, the main control loop 200 ends.

FIG. 6B presents 3D analysis subroutine 220 that is called by main control loop 200 when performing a 3D analysis of a tool that is under inspection. In step take 3D scan 222, controller 108 works in conjunction with 3D scanner 102 to analyze a 3D scan taken of the top of the tool under inspection. A 2D image of the top of a tool that is under inspection is shown in FIG. 4D. The 3D scanner works by projecting a striped pattern onto the top surface of the tool under inspection. As the striped pattern is distorted while following the contours of the tool, a camera on the 3D scanner records the distortion and from the distortion, a cloud of points is created. Each point is assigned an x, y, and z value to represent its position, an RGB value representing the amount of red, green, and blue in the point, and a luminance value to indicate the brightness of the point. Controller 108 gathers this cloud of points and performs an analysis of the top of the tool being inspected to determine the structural integrity of the top of the tool. The analysis of the 3D structural integrity of the tool is described in more detail when discussing FIG. 7. If the analysis of the structural integrity of the tool indicates that the tool has lost much of its structural integrity from whatever operations it has been exposed to, in step is tool scrap 226, the flow would classify the tool as scrap. If the analysis of the structural integrity of the tool indicates that the tool has lost only a portion of its structural integrity from whatever operations it has been exposed to, in step is tool degraded 228, the flow would classify the tool as degraded. If the tool has not been classified as scrap or degraded, then it is classified as reusable in step classify as reusable 230. Finally, 3D analysis subroutine 220 returns back to main control loop 200 the tool's classification.

FIG. 6C presents 2D analysis subroutine 240 that is called by main control loop 200 when performing a 2D analysis of a tool that is under inspection. In step take 2D picture 244, 2D camera 104 is used to take a picture of tool 46 that is being inspected on rotating platform 100. The best photograph is one where tool 46 is dark and imposed upon a light background. In this manner, the outline of the tool being inspected may be clearly identified and analyzed. To create such an image, white backdrop 110 is placed beyond the tool being inspected. At this point, step investigate 2D features 246 will analyze the photograph, take the appropriate measurements described in Table 3, and compare the measurements with the dimensions that have been retrieved from the profile selected in step operator selects profile 202. The analysis of the 2D structural integrity of the tool is described in more detail when discussing FIG. 8. If the 2D analysis of the structural integrity of the tool indicates that the tool has lost much of its structural integrity from whatever operations it has been exposed to, in step is tool scrap 248 the flow would branch to classify the tool as scrap and then exit the subroutine. If the analysis of the structural integrity of the tool indicates that the tool has lost only a portion of its structural integrity from whatever operations it has been exposed to, in step is tool degraded 252 the flow would branch to classify the tool as degraded. If the tool has not been classified as scrap or degraded, its classification would remain as reusable as initially classified in step classify tool as reusable 242. As the photograph recorded of the tool's outline is taken from a single aspect, and a tool's structural integrity may be compromised at other aspects, the aspect between tool 46 and 2D camera 104 must be changed so that the tool may be fully inspected. Typically this may be done by analyzing four pictures, a first picture of tool 46 on rotating platform 100, a second picture after tool 46 has been rotated 90 degrees by rotating platform 100, a third picture after tool 46 has been rotated 180 degrees by rotating platform 100, and a fourth picture after the tool has been rotated 270 degrees by rotating platform 100. Greater precision of the inspection may be accomplished by analyzing additional pictures at smaller degrees of separation from each other. In addition, tool 46 need only be rotated 180 degrees if time is of the essence but a full 360 degree inspection is best. In step has platform completed rotation 254, controller 108 determines if each required aspect of tool 46 has been inspected. If additional aspects remain, the flow branches to step rotate platform to next position 256 and then to step take 2D picture 244 where another picture is taken at the new aspect before repeating the analysis. If all of the aspects have been analyzed, 2D analysis subroutine 240 will exit and return the tool's classification.

FIG. 6D presents dispose of tool subroutine 280 that is called by main control loop 200 when disposing of an inspected tool. In step analyze classification 282, an analysis of the classification returned by the combination of 3D analysis subroutine 220 and 2D analysis subroutine 240 is performed. This analysis will determine how the tool being inspected is to be disposed of according to the truth table shown in Table 1 below.

TABLE 1

| 3D Classification | 2D Classification | Decision |
|---|---|---|
| Scrap | Not Performed | Scrap |
| Scrap | Not Performed | Scrap |
| Scrap | Not Performed | Scrap |
| Degraded | Scrap | Scrap |
| Degraded | Degraded | Degraded |
| Degraded | Reusable | Degraded |

TABLE 1-continued

| 3D Classification | 2D Classification | Decision |
|---|---|---|
| Reusable | Scrap | Scrap |
| Reusable | Degraded | Degraded |
| Reusable | Reusable | Reusable |

If in step analyze classification 282 the decision is to reuse tool 46, controller 108 will command robot arm 96 to pick tool 46 from rotating platform 100 and dispose of tool 46 in the reuse bin. Likewise, if in step analyze classification 282 the decision is that tool 46 has a degraded structural integrity, controller 108 will command robot arm 96 to pick tool 46 from rotating platform 100 and dispose of tool 46 in the degraded bin. Finally, if in step analyze classification 282 the decision is that tool 46 lacks structural integrity and is scrap, controller 108 will command robot arm 96 to pick tool 46 from rotating platform 100 and dispose of tool 46 in the scrap bin. After tool 46 has been disposed of, flow will return to main control loop 200.

Figure 7:
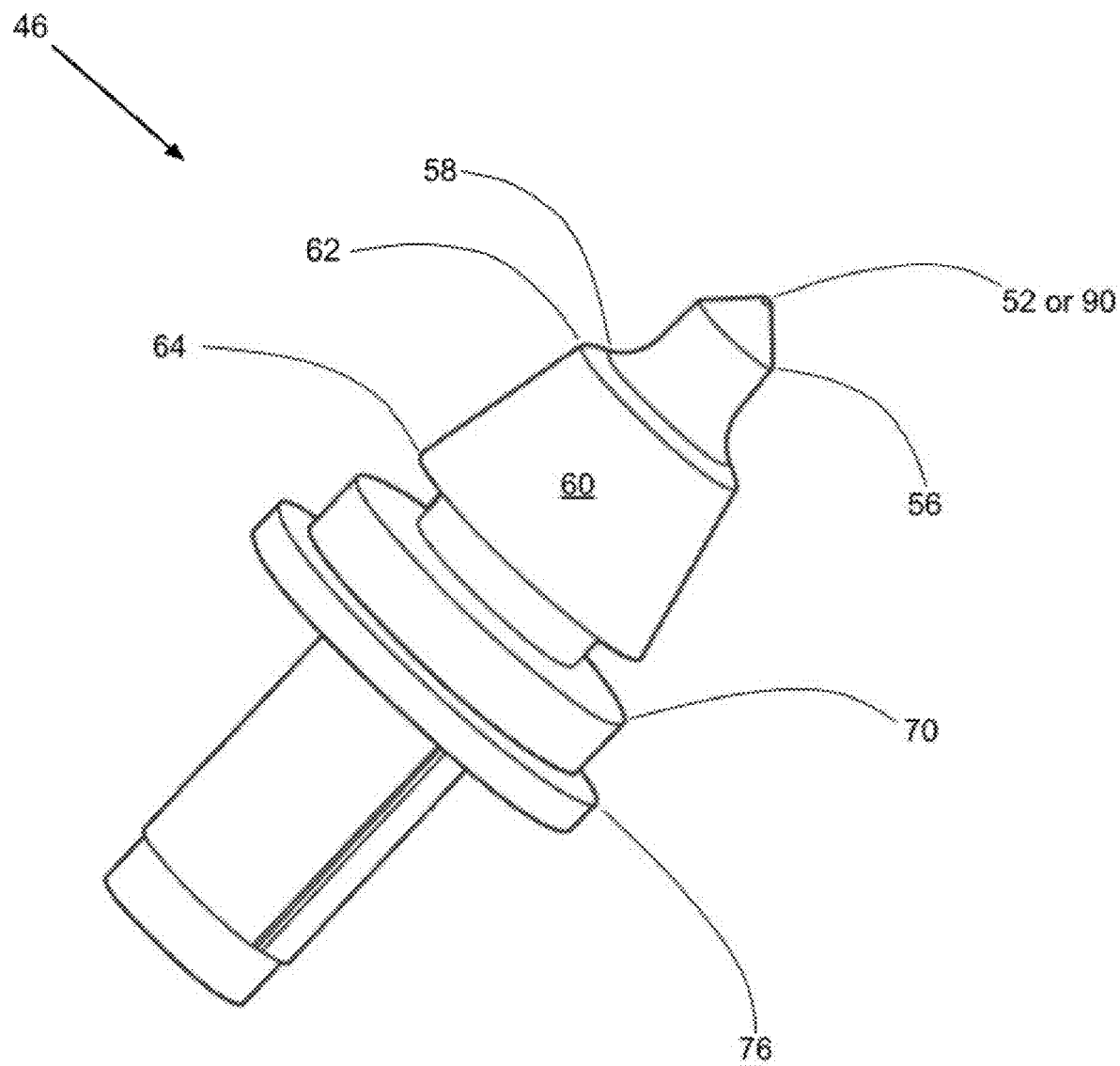
FIG. 7 shows a tool and identifies the various areas of interest captured by the 3D camera that is part of the autonomous workstation shown in FIG. 5.

FIG. 7 shows the features of interest that are scanned by 3D scanner 102 and analyzed by controller 108. The view of tool 46 visible to 3D scanner 102 is shown in FIG. 4D. As explained earlier, a 3D scanner works by projecting a pattern, typically straight lines, onto the object being scanned. Then with a camera, measuring the amount of distortion exhibited by the lines to calculate a set of points on the x, y, and z axis. These sets of points are often called a "cloud of points". Here, 3D scanner 102 will project a line pattern onto distal end 90 of tool 46 and build a cloud of points of the visible features. With this cloud of points, controller 108 may determine the amount of material loss by measuring the height of tool 46 and the roundness and diameter of various features of interest. These features of interest may vary from one tool to another and one with ordinary skill in the art would understand that one point or region may be of more significance than another point or region. The spatial relationship between 3D scanner 102 and tool 46 may vary but in this disclosure, 3D scanner 102 is directly above tool 46. Thus only the surfaces that are shown in FIG. 4D are visible to 3D scanner 102. The features of interest are shown in FIG. 4D and FIG. 7 and recorded in Table 2 below:

TABLE 2

| Feature of Interest | Comments |
|---|---|
| Height of tool 46 | Proximal end 88 is known as it is the height of rotating platform 100. distal end 90 is determined by 3D scanner 102. Subtracting the two will determine the height of tool 46. If the height of tool 46 is proper, this test passes. |
| Diameter and roundness of tip crown 56 | If the diameter and roundness of tip crown 56 are within tolerance, this test passes. |
| Diameter and roundness of tip skirt 58 | As the diameter of tip skirt 58 is greater than tip crown 56, it is visible to 3D scanner 102. If the diameter and roundness of tip skirt 58 are within tolerance, this test passes. |
| Diameter and roundness of body crown 62 | If the diameter and roundness of body crown 62 are within tolerance, this test passes. |
| Diameter and roundness of body skirt 64 | As body region 60 is roughly in the shape of a trapezoidal cylinder, body skirt 64 is observable by 3D scanner 102. If the diameter and roundness of body skirt 64 are within tolerance, this test passes. |

TABLE 2-continued

| Feature of Interest | Comments |
|---|---|
| Diameter and roundness of pad crown 70 | Pad skirt 72 is not visible to 3D scanner 102. If the diameter and roundness of pad crown 70 are within tolerance, this test passes. |
| Diameter and roundness of washer crown 76 | Washer skirt 78 is not visible to 3D scanner 102. If the diameter and roundness of washer crown 76 are within tolerance, this test passes. |

Figure 8:
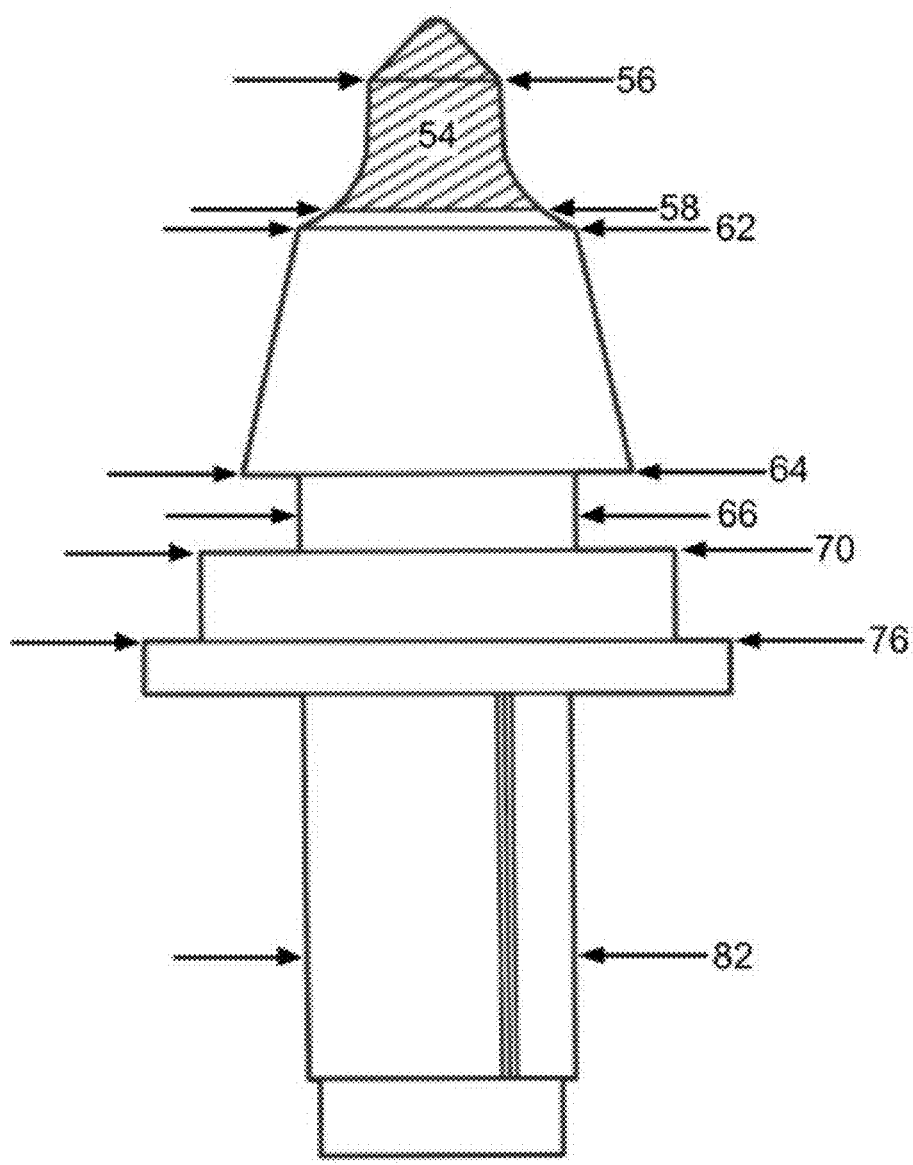
FIG. 8 shows a tool and identifies the various areas of interest captured by the 2D camera that is part of the autonomous workstation shown in FIG. 5.

FIG. 8 shows the features of interest that are imaged by 2D camera 104 and analyzed by controller 108. As 2D camera 104 may only capture the edges of tool 46, multiple images at different aspects of tool 46 must be imaged in order to accurately determine the extent of structural degradation. By rotating tool 46 on rotating platform 100, 2D camera 104 may record images of tool 46 from a number of aspects. For this disclosure, 2D camera 104 records and controller 108 analyzes eight images during one complete revolution or at every 45 degrees. One with skill in the art would understand that other frequencies are possible. These features of interest may vary from one tool to another and one with ordinary skill in the art would understand that one point or region may be of more significance than another point or region. The features of interest are shown in FIG. 8 and recorded in Table 3 below:

TABLE 3

| Features of Interest | Comments |
|---|---|
| Width of post 80 with retainer clip 82. | With this measurement, controller 108 will know if retainer clip 82 is present on post 80. If retainer clip 82 is present, this test passes. |
| Width of washer 74. | If the width of washer 74 is within tolerance, this test passes. |
| The angle of washer 74 edge. | If the angle of the edge from washer crown 76 to washer skirt 78 differs only nominally from 90 degrees, this test passes. |
| Width of groove 66. | If the width of groove 66 is within tolerance, this test passes. |
| Width of body skirt 64. | If the width of body skirt 64 is within tolerances, this test passes. |
| Width of body crown 62. | If the width of body crown 62 is within tolerance, this test passes. |
| Percent fill of tip region 54. | The outline of tip region 54 is superimposed against the outline of an intact tip region. Controller 108 calculates the percent of the intact tip region that is filled with tip region 54. If this percentage is sufficiently close to 100%, this test passes. |

Tests, whether with 3D scanner 102 or 2D camera 104 may be weighted depending upon the significance of the test or the degree of failure. Moreover, as 2D camera 104 records multiple images where each image is analyzed individually, the tool may be classified based on each individual analysis or as an aggregate of all of the images. Many possible schemes may be considered to classify the tool under inspection.

It will be apparent to those skilled in the art that various modifications and variations can be made to the disclosed system for the automated analysis and sorting of milling drum tools without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims and equivalents thereof.

What is claimed is:

1. An apparatus for determining wear on a tool used for removing a layer of asphalt on a road surface, the apparatus comprising:
   an incoming bin containing one or more said tools to be inspected and classified;
   two or more outgoing bins to receive said tools that have been classified;
   a work surface comprising:
      a platform having a central inspection site whereon said tool may be placed for inspection and classification;
      a 3-dimensional picking scanner positioned above said incoming bin capable of scanning said incoming bin to create a "cloud of points" therefrom to select a picked tool for inspection and classification;
      a robot having fingers at its distal end capable of transporting said picked tool from said incoming bin to said platform,
         placing said picked tool in an upright position upon said inspection site, and
         transporting said picked tool from said platform to one of two or more said outgoing bins according to said picked tool's classification;
      a 3-dimensional inspection scanner positioned above said inspection site capable of scanning those surfaces of said picked tool visible to said inspection scanner to create a "cloud of points" therefrom; and
      a 2-dimensional inspection camera capable of photographing picked tool's outline; and
   a controller capable of
      communicating with said picking scanner to receive the "cloud of points" created therefrom to select said picked tool;
      communicating with said platform;
      communicating with said robot;
      communicating with said inspection scanner to receive the "cloud of points" created therefrom to determine roundness and diameter of various features of interest of said picked tool;
      communicating with said inspection camera to receive picked tool's outline created therefrom to determine height, width, and angle of various features of interest of said picked tool; and
      classifying said picked tool's wear based upon the roundness, diameter, height, width, and angle of various features of interest of said picked tool.

2. The apparatus of claim 1 wherein said platform is capable of rotating.

3. The apparatus of claim 1 further comprising a backdrop.

4. A method for using said inspection scanner of claim 1 the method comprising:
   measuring the height of said tool;
   measuring the diameter and roundness of said tool's tip crown;
   measuring the diameter and roundness of said tool's tip skirt;
   measuring the diameter and roundness of said tool's body crown;
   measuring the diameter and roundness of said tool's body skirt; measuring the diameter and roundness of said tool's pad crown;
   measuring the diameter and roundness of said tool's washer crown; and
   determining if said tool is reusable, degraded, or scrap by comparing the measurements against a predefined set of criteria.

5. A method for using said inspection camera of claim 1 the method comprising:
   measuring the width of said tool's post with retainer clip;
   measuring the width of said tool's washer;
   measuring the angle of said tool's washer edge;
   measuring the width of said tool's groove;
   measuring the width of said tool's body skirt;
   measuring the width of said tool's body crown;
   measuring the percent fill of said tool's tip region; and
   determining if said tool is reusable, degraded, or scrap by comparing the measurements against a predefined set of criteria.

6. The method of claim 5 wherein said method is repeated at more than one angular aspect relative to said tool.

7. The method of claim 6 wherein said method is no longer repeated if said tool is determined to be scrap.

* * * * *